United States Patent
Dhanda et al.

(10) Patent No.: US 8,970,980 B1
(45) Date of Patent: Mar. 3, 2015

(54) DISK DRIVE EVALUATING BURST METRIC

(75) Inventors: Abhishek Dhanda, San Jose, CA (US);
Wei Guo, Fremont, CA (US); Russ A. Quisenberry, San Jose, CA (US);
Guoxiao Guo, Foothill Ranch, CA (US);
Jie Yu, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 586 days.

(21) Appl. No.: 13/169,938

(22) Filed: Jun. 27, 2011

(51) Int. Cl.
*G11B 21/02* (2006.01)
*G11B 5/596* (2006.01)

(52) U.S. Cl.
USPC .......................................... 360/75; 360/78.04

(58) Field of Classification Search
None
See application file for complete search history.

(56) References Cited

U.S. PATENT DOCUMENTS

| | | | |
|---|---|---|---|
| 6,493,176 B1 | 12/2002 | Deng et al. | |
| 6,496,322 B1 * | 12/2002 | Hasegawa et al. | 360/77.08 |
| 6,751,036 B2 | 6/2004 | Quak et al. | |
| 6,943,972 B1 | 9/2005 | Chue et al. | |
| 6,987,636 B1 | 1/2006 | Chue et al. | |
| 6,992,849 B2 | 1/2006 | Yeo et al. | |
| 7,027,253 B1 | 4/2006 | Sun et al. | |
| 7,046,471 B2 | 5/2006 | Meyer et al. | |
| 7,068,459 B1 | 6/2006 | Cloke et al. | |
| 7,110,197 B2 | 9/2006 | Cho | |
| 7,133,237 B2 | 11/2006 | Ikeda et al. | |
| 7,154,689 B1 * | 12/2006 | Shepherd et al. | 360/48 |
| 7,164,552 B2 | 1/2007 | Yamamoto | |
| 7,433,143 B1 | 10/2008 | Ying et al. | |
| 7,602,575 B1 | 10/2009 | Lifchits et al. | |
| 7,688,540 B1 | 3/2010 | Mei et al. | |
| 2012/0033323 A1 * | 2/2012 | Mathew et al. | 360/75 |

* cited by examiner

*Primary Examiner* — Andrew L Sniezek

(57) ABSTRACT

A disk drive is disclosed comprising a disk and a head actuated over the disk. A burst metric is generated in response to a burst read signal. The burst metric comprises at least one of an alpha metric comprising a ratio of a first burst amplitude of a first phased based servo burst measured at a first radial offset to a second burst amplitude of a second phased based servo burst measured at a second radial offset, a harmonic metric comprising a ratio of a first harmonic of the burst read signal as the head is moved radially over the disk to a higher harmonic of the burst read signal as the head is moved radially over the disk, and a spiral track crossing metric comprising a first and second interval each representing a partial duration of the read element crossing a spiral track.

14 Claims, 6 Drawing Sheets

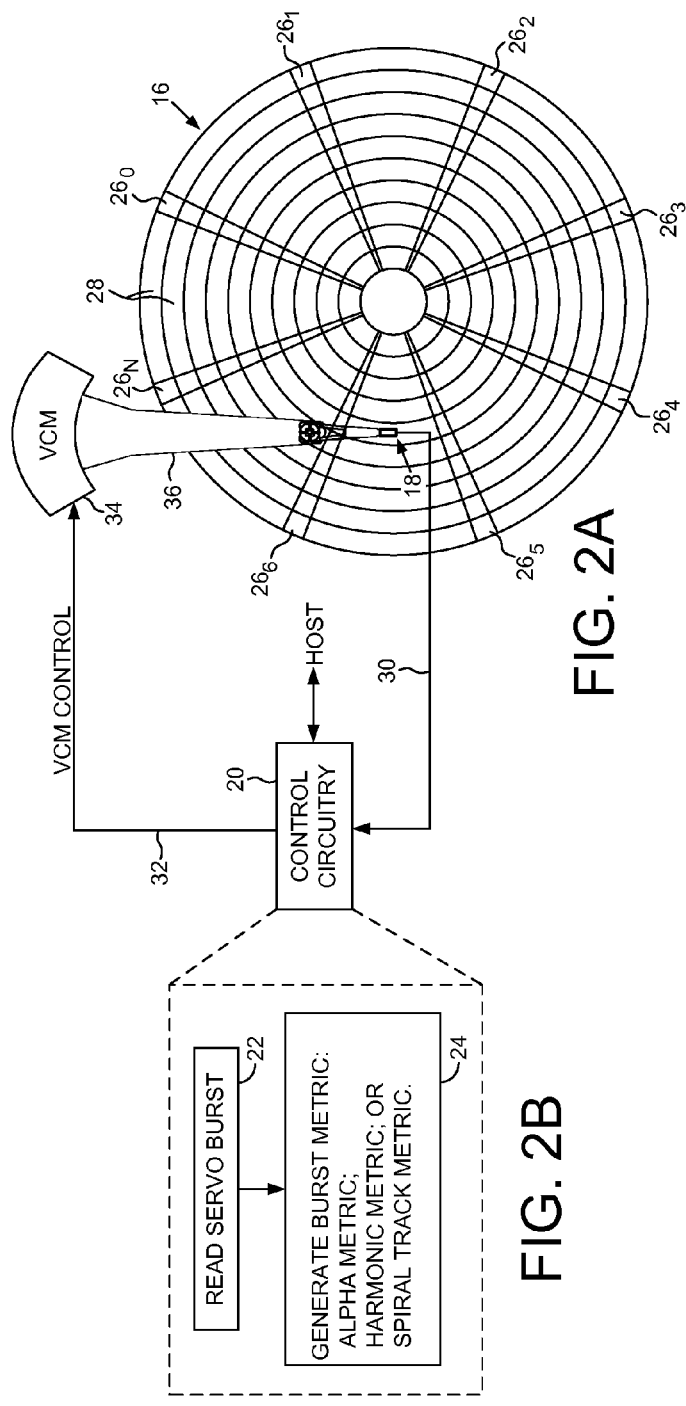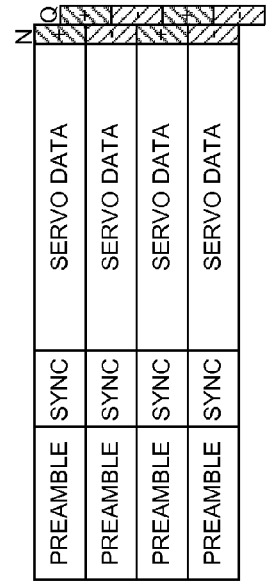

READER WIDTH = T1 · tan(θ)
WRITER WIDTH = (T1+T2) · tan(θ)

US 8,970,980 B1

DISK DRIVE EVALUATING BURST METRIC

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

FIG. 1 shows a prior art disk format 2 as comprising a number of servo tracks 6 defined by servo sectors $4_0$-$4_N$ recorded around the circumference of each servo track.

Each servo sector $4_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $4_i$ further comprises groups of servo bursts 14 (A,B,C,D in the example shown), which are recorded with precise intervals and offsets relative to the track centerlines. The servo bursts 14 provide fine head position information used for centerline tracking while accessing a data track during write/read operations.

BRIEF DESCRIPTION OF THE DRAWINGS

FIG. 2A shows a disk drive according to an embodiment of the present invention comprising a head actuated over a disk.

FIG. 2B is a flow diagram according to an embodiment of the present invention wherein a burst metric is generated comprising at least one of an alpha metric, a harmonic metric, and a spiral track crossing metric.

FIG. 2C shows an embodiment of the present invention wherein the servo sectors comprise amplitude based servo bursts.

FIG. 2D shows an embodiment of the present invention wherein the servo sectors comprise phase based servo bursts.

DETAILED DESCRIPTION OF EMBODIMENTS OF THE INVENTION

Figure 1:
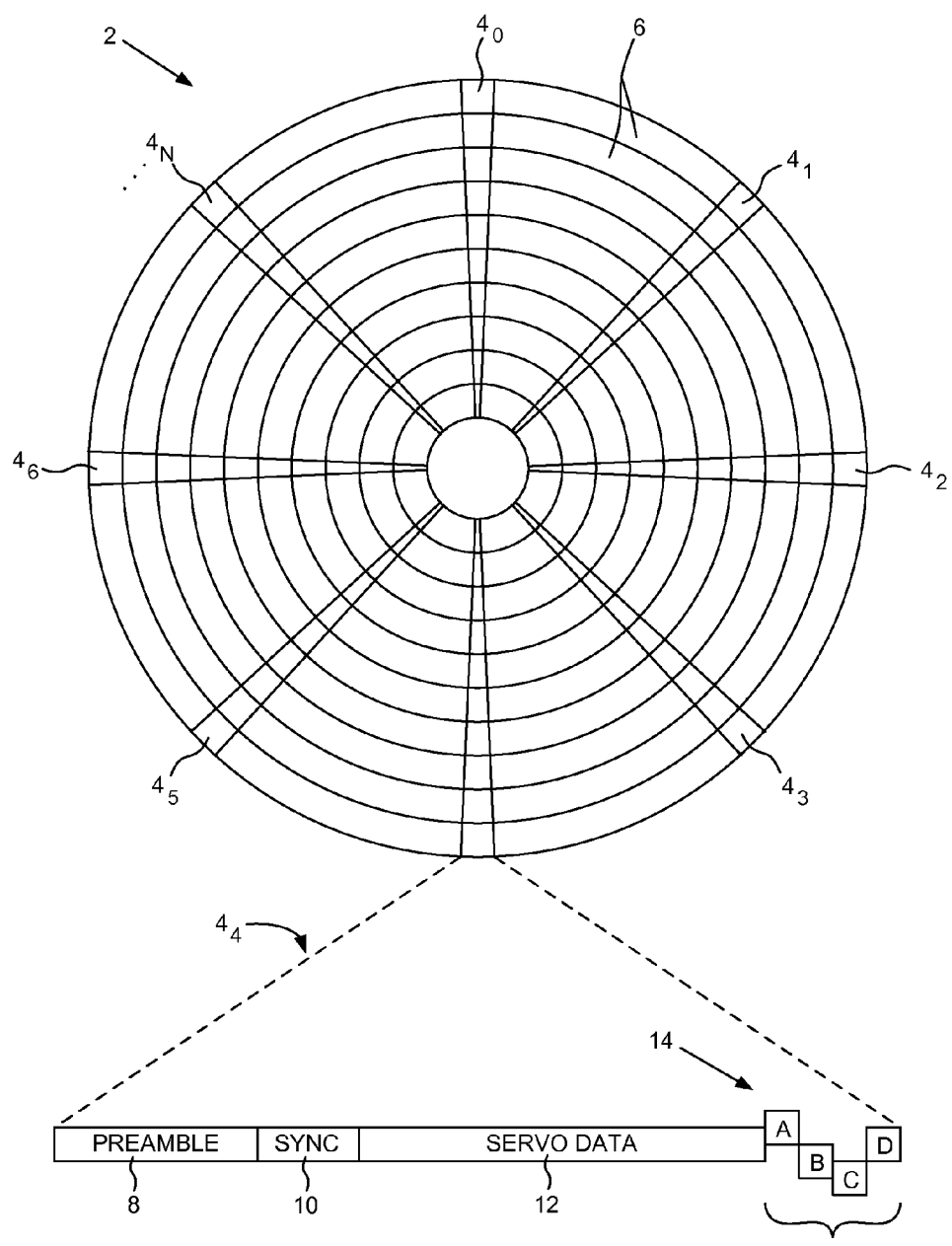
FIG. 1 shows a prior art disk format comprising a plurality of tracks defined by embedded servo sectors.

FIG. 2A shows a disk drive according to an embodiment of the present invention comprising a disk 16 and a head 18 actuated over the disk 16, the head 18 comprising a read element and a write element. The disk drive further comprises control circuitry 20 operable to execute the flow diagram of FIG. 2B wherein at least one servo burst is read from the disk to generate a burst read signal (step 22), and a burst metric is generated in response to the burst read signal (step 24). The burst metric comprises at least one of an alpha metric comprising a ratio of a first burst amplitude of a first phased based servo burst measured at a first radial offset to a second burst amplitude of a second phased based servo burst measured at a second radial offset, a harmonic metric comprising a ratio of a first harmonic of the burst read signal as the head is moved radially over the disk to a higher harmonic of the burst read signal as the head is moved radially over the disk, and a spiral track crossing metric comprising a first and second interval each representing a partial duration of the read element crossing a spiral track.

In the embodiment of FIG. 2A, the disk 16 comprises embedded servo sectors $26_0$-$26_N$ that define a plurality of servo tracks 28. The control circuitry 20 processes a read signal 30 emanating from the head 18 to demodulate the servo sectors $26_0$-$26_N$ and generate a position error signal (PES) representing an error between the actual position of the head and a target position relative to a target track. The control circuitry 20 filters the PES using a suitable compensation filter to generate a control signal 32 applied to a voice coil motor (VCM) 34 which rotates an actuator arm 36 about a pivot in order to actuate the head 18 radially over the disk in a direction that reduces the PES. The servo sectors $26_0$-$26_N$ may comprise any suitable position information, such as a track address for coarse positioning and servo bursts for fine positioning. The servo bursts may comprise any suitable servo burst pattern, such as an amplitude based servo burst pattern (A,B,C,D quadrature pattern) shown in FIG. 2C, or a phase based servo burst pattern (N,Q servo bursts) shown in FIG. 2D.

In one embodiment, the burst metric may be generated prior to servo writing the servo sectors $26_0$-$26_N$ onto the disk. For example in one embodiment, the burst metric may be generated in order to qualify the head, wherein the head may be depopulated if deemed unacceptable. In another embodiment, the burst metric may be generated in order to select an optimal servo tracks per inch (TPI), wherein the product servo sectors $26_0$-$26_N$ are servo written on the disk according to the selected servo TPI. In one embodiment an external servo writer may generate the burst metric and then servo write the disk using the corresponding servo TPI, and in another embodiment, the control circuitry 20 internal to each disk drive may generate the burst metric and then self servo write the disk using the corresponding servo TPI.

In one embodiment, one or more bands of calibration servo tracks are written to the disk in order to generate the burst metric. The servo sectors in the calibration servo tracks may comprise the same servo burst pattern as that used to servo write the disk with the product servo sectors, or the servo sectors in the calibration servo tracks may comprise a different servo burst pattern. For example, in one embodiment the product servo sectors written across the entire disk surface comprise amplitude based servo bursts (e.g., the A,B,C,D quadrature servo pattern of FIG. 2C), wherein the calibration servo tracks may be written with both amplitude based servo bursts as well as with phase based servo bursts (e.g., the N,Q servo burst pattern of FIG. 2D). A burst metric is generated for each type of servo burst pattern in the calibration servo tracks, and then the burst metrics are evaluated in order to servo write the disk (with amplitude or phase based servo bursts) using the optimal servo TPI selected in response to the burst metrics.

Figure 3A:
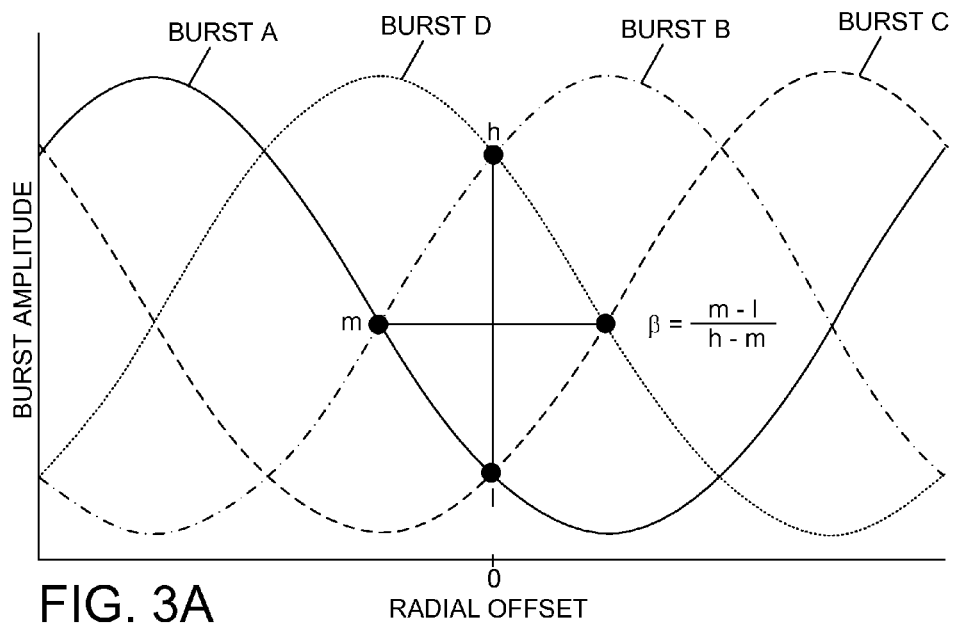
FIG. 3A shows an embodiment of the present invention wherein the burst metric comprises a beta metric generated from reading amplitude based servo bursts.

FIG. 3A shows a burst read signal generated when reading amplitude based servo bursts (A,B,C,D quadrature servo pattern of FIG. 2C) written in the calibration servo tracks. Each sinusoid represents the magnitude of the burst read signal for each of the A,B,C,D servo bursts as the head is moved radially relative to a target (zero offset) position. In one embodiment, a beta burst metric is generated according to:

$$\frac{m-1}{h-m}$$

where (referring to FIG. 3A) h is a first burst amplitude of a first amplitude based servo burst, I is a second burst amplitude of a second amplitude based servo burst, and m is a third burst amplitude of a third amplitude based servo burst. As the servo TPI of the calibration tracks changes, there is a corresponding change in the above described beta burst metric. In one embodiment, the servo TPI that generates the optimal beta burst metric is selected to servo write the product servo sectors.

The servo TPI of the calibration servo tracks may be adjusted by rewriting the calibration servo tracks at different servo TPIs, or multiple bands of calibration servo tracks may be written with an incremental change in the servo TPI for each band. The calibration servo tracks may be written at different servo TPIs with an external servo writer using a highly accurate servo positioning system (e.g., using a laser interferometer). In another embodiment, the calibration servo tracks may be written with the control circuitry 20 internal to each disk drive by servoing off of a servo seed pattern (e.g., a plurality of spiral tracks) recorded on the disk. In yet another embodiment, the control circuitry 20 may propagate a servo burst pattern from an initial seed pattern, and adjust the servo TPI of the calibration servo tracks as the servo burst pattern is propagated until the desired burst metric is attained.

Figure 3B:
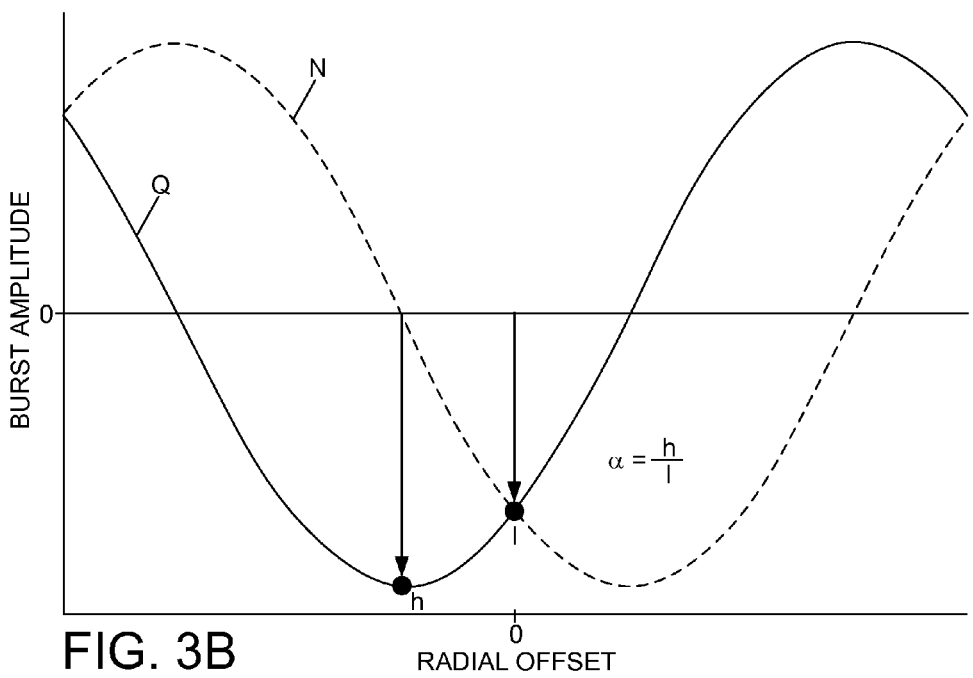
FIG. 3B shows an embodiment of the present invention wherein the burst metric comprises an alpha metric generated from reading phase based servo bursts.

FIG. 3B shows a burst read signal generated when reading phased based servo bursts (N,Q servo pattern of FIG. 2D) written in the calibration servo tracks. Each sinusoid represents the magnitude of the burst read signal for each of the N,Q servo bursts as the head is moved radially relative to a target (zero offset) position. In one embodiment, an alpha burst metric is generated according to a ratio of a first burst amplitude h of a first phased based servo burst measured at a first radial offset to a second burst amplitude I of a second phased based servo burst measured at a second radial offset. In the embodiment of FIG. 3B, the first radial offset corresponds to when an amplitude of the first phase based servo burst (N) substantially equals an amplitude of the second phase based servo burst (Q), and the second radial location corresponds to when an amplitude of the second phase based servo burst (Q) is substantially at a minimum. Similar to the beta burst metric described above, the alpha burst metric may be generated for different servo TPIs until an optimal servo TPI generates the desired alpha burst metric. In yet another embodiment, both the alpha and beta burst metrics may be evaluated in order to select the optimal servo TPI for servo writing the disk.

Figure 4:
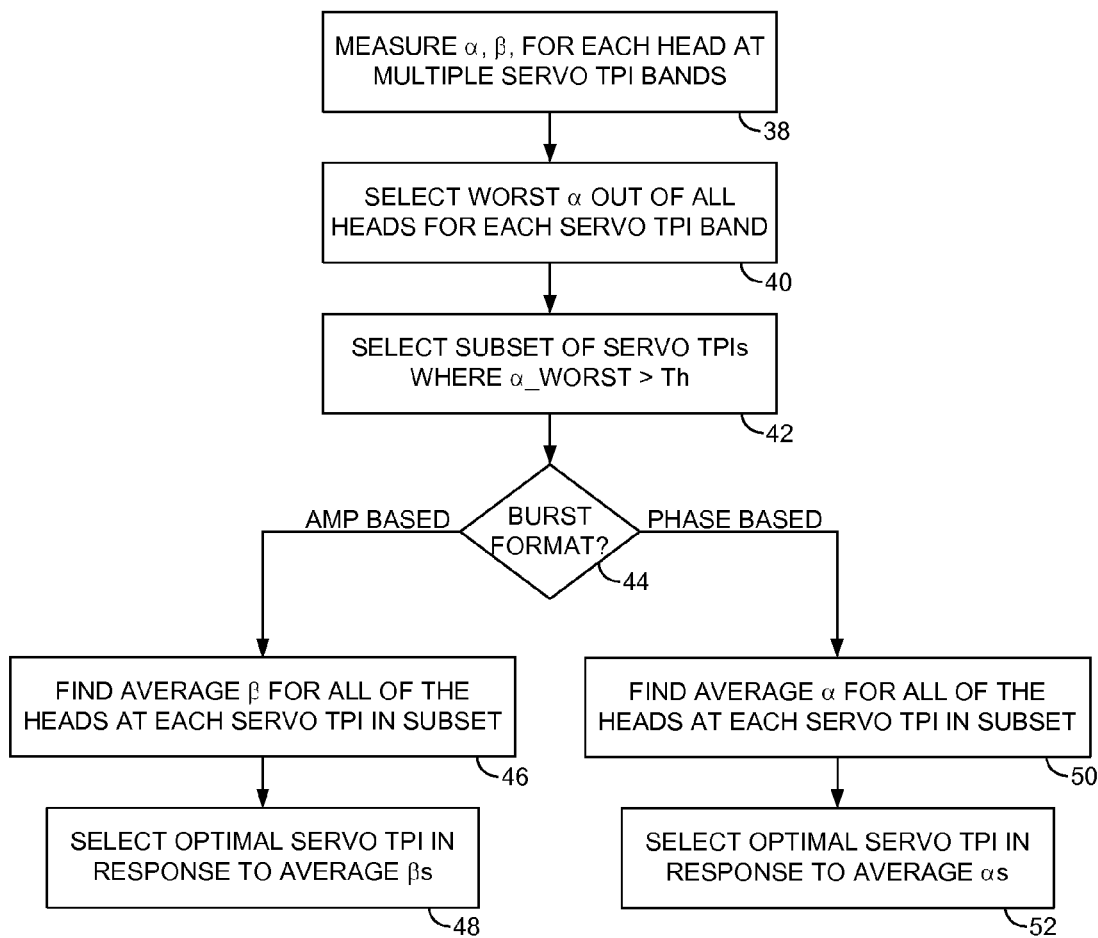
FIG. 4 is a flow diagram according to an embodiment of the present invention wherein an optimal servo tracks per inch (TPI) is selected based on the alpha and beta burst metrics.

FIG. 4 is a flow diagram according to an embodiment of the present invention wherein an alpha and beta burst metric are generated for each of a plurality of heads in a multi-head disk drive (step 38). The alpha and beta burst metric are generated over multiple calibration servo track bands, wherein each servo track band is recorded at an incrementally different servo TPI. For each calibration servo track band, the worst alpha burst metric generated out of all of the heads is selected (step 40). A subset of the servo TPIs is then selected that satisfy the condition where the worst alpha burst metric exceeds a threshold (step 42). The optimal servo TPI for servo writing the disk is then selected based on the type of servo burst pattern being written (step 44).

When servo writing an amplitude based servo pattern (e.g., A,B,C,D quadrature servo pattern of FIG. 2C), the average beta burst metric is determined for all of the heads at each servo TPI in the subset of servo TPIs (step 46). The optimal servo TPI for servo writing the disk is then selected in response to the average beta burst metrics, such as the servo TPI that corresponds to the best average beta burst metric (step 48).

When servo writing a phase based servo pattern (e.g., N,Q servo pattern of FIG. 2D), the average alpha burst metric is determined for all of the heads at each servo TPI in the subset of servo TPIs (step 50). The optimal servo TPI for servo writing the disk is then selected in response to the average alpha burst metrics, such as the servo TPI that corresponds to the best average alpha burst metric (step 52).

In an alternative embodiment of the present invention, the burst metric comprises a harmonic metric comprising a ratio of a first harmonic of the burst read signal as the head is moved radially over the disk to a higher harmonic of the burst read signal as the head is moved radially over the disk. Examples of the burst read signal as the head moves radially over the disk (off-track profile) are shown in FIGS. 3A and 3B. The resulting burst read signal is substantially sinusoidal, but becomes distorted as the servo TPI deviates from an optimal value (decreases or increases). In one embodiment, this distortion is reflected in higher harmonics of the burst read signal (off-track profile).

Figure 5A:
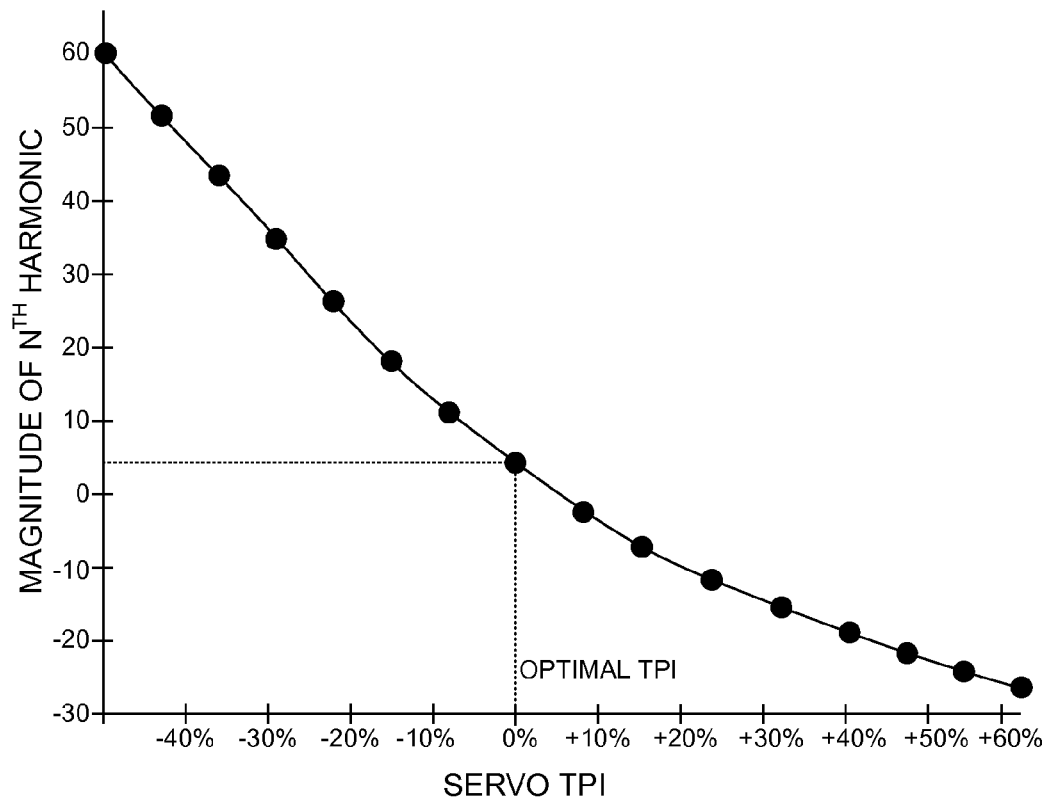
FIG. 5A illustrates an embodiment of the present invention wherein an optimal servo TPI is selected based on a magnitude of a harmonic of an off-track profile.

The example of FIG. 5A shows that the servo TPI is optimal when a magnitude of a higher harmonic (e.g., third harmonic) of the burst read signal is near a minimum. When the servo TPI decreases below the optimal value, the magnitude of the higher harmonic increases with a positive sign (phase), and when the servo TPI increases above the optimal value, the magnitude of the higher harmonic increases with a negative sign (phase). Accordingly, in one embodiment a ratio of the first harmonic to a higher harmonic (e.g., third harmonic) is measured at various servo TPIs, and the servo TPI that generates the desired harmonic ratio is selected to servo write the disk.

Figure 5B:
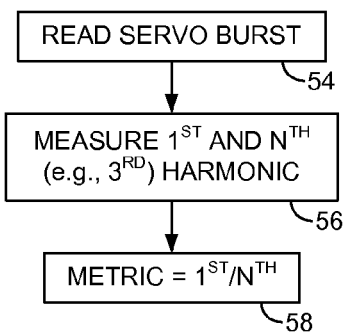
FIG. 5B is a flow diagram according to an embodiment of the present invention wherein the burst metric comprises a ratio of a first harmonic to a higher harmonic of the burst read signal representing an off-track profile.

This embodiment is understood with reference to the flow diagram of FIG. 5B wherein at least one servo burst in the calibration servo tracks is read as the head is moved radially over the disk (step 54) and a first harmonic and a higher harmonic (e.g., third harmonic) in the burst read signal (off-track profile) is measured (step 56). The burst metric is then generated as a ratio of the first harmonic to the higher harmonic (step 58). In one embodiment, the harmonic metric may be generated for a number of different servo bursts (e.g., A,B,C,D servo bursts of FIG. 3A). The resulting harmonic metrics are then averaged, wherein an average harmonic metric is generated for each servo TPI. The servo TPI that generates the best average harmonic metric is then selected to servo write the disk.

In one embodiment, the time to calibrate the optimal servo TPI may be reduced by evaluating the magnitude and sign (phase) of the higher harmonic at an initial servo TPI, and then adjusting the servo TPI based on the initial measurement. For example, if the sign of the initial higher harmonic measurement is positive, the servo TPI may be increased toward the optimal servo TPI, and if the sign is negative, the servo TPI may be decreased toward the optimal servo TPI as illustrated in FIG. 5A.

Figures 6A, 6B:
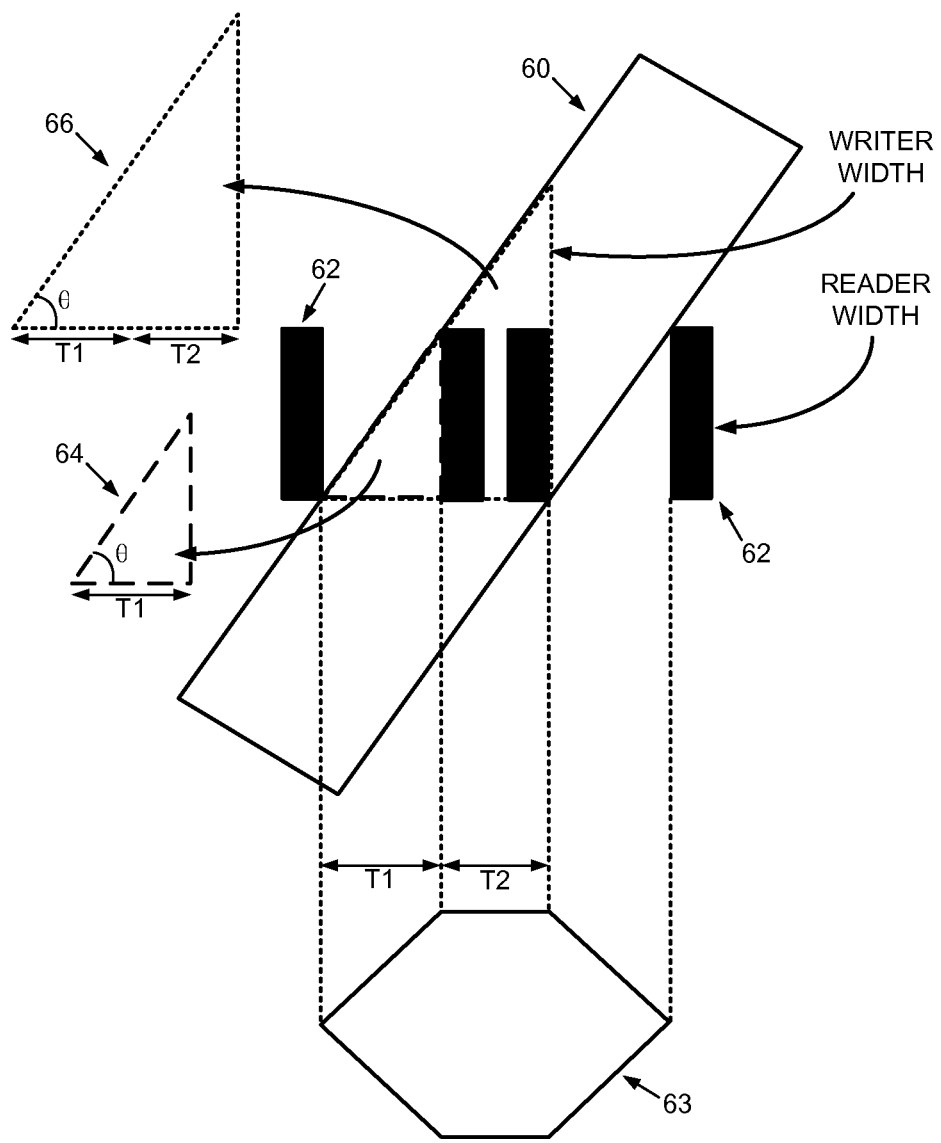
FIG. 6A shows an embodiment of the present invention wherein the burst metric comprises a spiral track crossing metric comprising a first and second interval each representing a partial duration of the read element crossing a spiral track.
FIG. 6B shows an embodiment of the present invention wherein a reader width and writer width are estimated in response to the spiral track crossing metric.

FIG. 6A shows an embodiment of the present invention wherein the burst metric comprises a spiral track crossing metric (i.e., the burst read signal is generated by reading a spiral track). A number of spiral tracks may be written on the disk (e.g., spiral track 60) by moving the head radially across the surface of the disk while writing a high frequency signal periodically interrupted by sync marks. The spiral tracks may be used to servo the head over the disk, for example, in order to write product servo sectors that define concentric servo tracks. An example of using spiral tracks to servo write the disk is disclosed in U.S. Pat. No. 7,301,717 entitled "SERVO WRITING A DISK DRIVE BY INTEGRATING A SPIRAL TRACK READ SIGNAL" the disclosure of which is incorporated herein by reference.

In one embodiment, a burst metric is generated in response to the burst read signal as the read element 62 crosses over a spiral track 60. FIG. 6A shows an example football shaped burst read signal 63 comprising a first interval T1 which represents a duration from when the read element 62 first reaches the spiral track 60 to when the read element 62 is completely over the spiral track 60. The first interval T1 defines a triangle 64 wherein the width of the read element is estimated according to the equation shown in FIG. 6B:

$$T1 \cdot \tan(\theta)$$

wherein $\theta$ is an angle of the read element 62 relative to the spiral track 60. A second interval T2 represents a duration that the read element 62 is completely over the spiral track 60 as illustrated in FIG. 6A. The first and second intervals T1+T2 define a triangle 66, wherein the width of the write element (which was used to write the spiral track 60) may be estimated according to the equation shown in FIG. 6B:

$$(T1+T2) \cdot \tan(\theta)$$

wherein $\theta$ is an angle of the read element 62 relative to the spiral track 60. The estimated width of the read element 62 and/or the estimated width of the write element (not shown) may be used for any suitable purpose, such as qualifying the head or selecting an optimal servo TPI for servo writing the disk.

In the embodiments of the present invention where the burst metric is used to select an optimal servo TPI to servo write the disk, the burst metric may be measured at multiple radial locations across the disk surface and a corresponding optimal servo TPI selected at each radial location. This embodiment may take into account the skew angle of the head as it moves toward the outer diameter and/or inner diameter of the disk. Accordingly, in one embodiment an optimal servo TPI profile may be defined across the surface of the disk, for example, by extrapolating the burst metrics measured at several discrete radial locations.

The disk drive of FIG. 2A may comprise a dynamic fly height (DFH) actuator, such as a suitable heater or microactuator, for dynamically adjusting a fly height of the head toward a target fly height. Maintaining the head at a target fly height may improve the signal-to-noise ratio of the recorded signal during write operations as well as the corresponding read signal during read operations. However, there are times when the control circuitry may disable the DFH servo system or increase the target fly height (e.g., to avoid a thermal asperity). In one embodiment, the burst metrics may be generated while the DFH servo system is tracking the lower fly height corresponding to a normal write or read operation. After selecting the optimal servo TPI in response to the burst metrics, the DFH servo system may be disabled or the target fly height increased. The calibration servo tracks written at the selected servo TPI may then be read to regenerate the corresponding burst metric. If the resulting burst metric deviates beyond a predetermined threshold, remedial action may be taken, such as selecting a different servo TPI, trimming the selected servo burst pattern, or selecting a different servo burst pattern.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

what is claimed is:

1. A disk drive comprising:
a disk;
a head actuated over the disk, the head comprising a read element and a write element; and
control circuitry operable to:
    read at least one servo burst from the disk to generate a burst read signal; and
    generate a burst metric in response to the burst read signal, wherein the burst metric comprises at least one of:
    an alpha metric comprising a ratio of a first burst amplitude of a first phased based servo burst measured while the head is positioned at a first radial offset to a second burst amplitude of a second phased based servo burst measured while the head is positioned at a second radial offset different from the first radial offset; and
    a harmonic metric comprising a ratio of a first harmonic of the burst read signal representing an off-track profile as the head is moved radially over the disk to a higher harmonic of the burst read signal representing the off-track profile as the head is moved radially over the disk.

2. The disk drive as recited in claim 1, wherein the burst metric comprises the alpha metric.

3. The disk drive as recited in claim 2, wherein:
the first radial offset corresponds to when an amplitude of the first phase based servo burst substantially equals an amplitude of the second phase based servo burst; and
the second radial offset corresponds to when an amplitude of the second phase based servo burst is substantially at a minimum.

4. The disk drive as recited in claim 2, wherein the burst metric further comprises a beta metric comprising a ratio:

$$\frac{m-l}{h-m}$$

where:
h is a first burst amplitude of a first amplitude based servo burst;
I is a second burst amplitude of a second amplitude based servo burst; and
m is a third burst amplitude of a third amplitude based servo burst.

5. The disk drive as recited in claim 1, wherein the burst metric comprises the harmonic metric.

6. The disk drive as recited in claim 5, wherein the higher harmonic comprises a third harmonic of the burst read signal.

7. The disk drive as recited in claim 6, wherein the at least one servo burst comprises an amplitude based servo burst.

8. A method of operating a disk drive, the disk drive comprising a disk and a head actuated over the disk, the head comprising a read element and a write element, the method comprising:
reading at least one servo burst from the disk to generate a burst read signal; and
generating a burst metric in response to the burst read signal, wherein the burst metric comprises at least one of:
an alpha metric comprising a ratio of a first burst amplitude of a first phased based servo burst measured while the head is positioned at a first radial offset to a second burst amplitude of a second phased based servo burst measured while the head is positioned at a second radial offset different from the first radial offset; and
a harmonic metric comprising a ratio of a first harmonic of the burst read signal representing an off-track profile as the head is moved radially over the disk to a higher harmonic of the burst read signal representing the off-track profile as the head is moved radially over the disk.

9. The method as recited in claim 8, wherein the burst metric comprises the alpha metric.

10. The method as recited in claim 9, wherein:
the first radial offset corresponds to when an amplitude of the first phase based servo burst substantially equals an amplitude of the second phase based servo burst; and
the second radial offset corresponds to when an amplitude of the second phase based servo burst is substantially at a minimum.

11. The method as recited in claim 9, wherein the burst metric further comprises a beta metric comprising a ratio:

$$\frac{m-l}{h-m}$$

where:
h is a first burst amplitude of a first amplitude based servo burst;
I is a second burst amplitude of a second amplitude based servo burst; and
m is a third burst amplitude of a third amplitude based servo burst.

12. The method as recited in claim 8, wherein the burst metric comprises the harmonic metric.

13. The method as recited in claim 12, wherein the higher harmonic comprises a third harmonic of the burst read signal.

14. The method as recited in claim 13, wherein the at least one servo burst comprises an amplitude based servo burst.

* * * * *